US012670924B2

(12) United States Patent
Sung et al.

(10) Patent No.: US 12,670,924 B2
(45) Date of Patent: Jun. 30, 2026

(54) SPATIAL REGION BASED AUDIO SEPARATION

(71) Applicant: Google LLC, Mountain View, CA (US)

(72) Inventors: George Chiachi Sung, San Diego, CA (US); Yang Yang, San Diego, CA (US); Shao-Fu Shih, San Jose, CA (US); Hakan Erdogan, Lexington, MA (US); Kevin Lee, Mountan View, CA (US)

(73) Assignee: Google LLC, Mountain View, CA (US)

( * ) Notice: Subject to any disclaimer, the term of this patent is extended or adjusted under 35 U.S.C. 154(b) by 137 days.

(21) Appl. No.: 18/525,307

(22) Filed: Nov. 30, 2023

(65) Prior Publication Data

US 2025/0182775 A1 Jun. 5, 2025

(51) Int. Cl.
*G10L 21/057* (2013.01)
*G10L 15/06* (2013.01)
*G10L 25/30* (2013.01)

(52) U.S. Cl.
CPC .......... *G10L 21/057* (2013.01); *G10L 15/063* (2013.01); *G10L 25/30* (2013.01)

(58) Field of Classification Search
CPC ............................ G10L 15/057; G10L 15/067
USPC ......................................................... 704/232
See application file for complete search history.

(56) References Cited

U.S. PATENT DOCUMENTS 11,699,454 B1 * 7/2023 D Souza ................ H04R 3/005
381/71.1
12,169,663 B1 * 12/2024 Nagisetty ................ G06F 3/165

| | | | |
|---|---|---|---|
| 2014/0241529 A1 | 8/2014 | Lee | |
| 2020/0349954 A1 | 11/2020 | Yoshioka et al. | |
| 2021/0043220 A1 | 2/2021 | Baek et al. | |
| 2022/0068257 A1 * | 3/2022 | Biadsy | G10L 15/16 |
| 2023/0032280 A1 | 2/2023 | Celestinos Arroyo et al. | |
| 2025/0118318 A1 * | 4/2025 | Montazeri | G10L 21/0208 |

FOREIGN PATENT DOCUMENTS

CN 117499852 A * 2/2024 ............. H04S 7/303

OTHER PUBLICATIONS

T. S. Gunawan, M. R. M. Sarif, M. Kartiwi and Y. A. Ahmad, "Development of U-Net Architecture for Audio Super Resolution," 2023 9th International Conference on Computer and Communication Engineering (ICCCE), Kuala Lumpur, Malaysia, 2023, pp. 132-137, doi: 10.1109/ICCCE58854.2023.10246115. keywords: { (Year: 2023).*

(Continued)

*Primary Examiner* — Paras D Shah
(74) *Attorney, Agent, or Firm* — Honigman LLP; Brett A. Krueger; Grant Griffith

(57) ABSTRACT

A method includes receiving target audio data captured by a first audio input device, the target audio data comprising a target audio signal and a first version of an interfering audio signal, and receiving reference audio data captured by a second audio input device different from the first audio input device, the reference audio data comprising a second version of the interfering audio signal. The method also includes processing, using a trained neural network, the target audio data and the reference audio data to generate enhanced audio data, the neural network attenuating the interfering audio signal in the enhanced audio data.

22 Claims, 8 Drawing Sheets

(56) References Cited

OTHER PUBLICATIONS

Nugraha, Aditya Arie, Antoine Liutkus, and Emmanuel Vincent. "Multichannel audio source separation with deep neural networks." IEEE/ACM Transactions on Audio, Speech, and Language Processing 24.9 (2016): 1652-1664.*

Xu, Alan, and Romit Roy Choudhury. "Learning to separate voices by spatial regions." International Conference on Machine Learning. PMLR, 2022.*

International Search Report and Written Opinion issued in related PCT Application No. PCT/US2024/054507, dated Dec. 23, 2024.

Dejan Markovic et al: "Implicit Neural Spatial Filtering for Multi-channel Source Separation in the Waveform Domain", arxiv.org, Cornell University Library, 201 Olin Library Cornell University Ithaca, NY 14853, Jun. 30, 2022 (Jun. 30, 2022), XP091260232.

Teerapat Jenrungrot et al: "The Cone of Silence: Speech Separation by Localization", arxiv.org, Cornell University Library, 201 Olin Library Cornell University Ithaca, NY 14853, Oct. 12, 2020 (Oct. 12, 2020), XP081784961.

Tan Ke et al: "Neural Spectrospatial Filtering", IEEE/ACM Transactions on Audio, Speech, and Language Processing, vol. 30, Jan. 25, 2022 (Jan. 25, 2022), pp. 605-621, XP093232280, ISSN: 2329-9290, DOI:10.1109/TASLP.2022.3145319.

Yang Yang et al: "Binaural Angular Separation Network", ICASSP 2024—2024 IEEE International Conference on Acoustics, Speech and Signal Processing (ICASSP), IEEE, Apr. 14, 2024 (Apr. 14, 2024), pp. 12-01-1205, XP034654546, DOI: 10.1109/ICASSP48485. 2024.10446587.

* cited by examiner

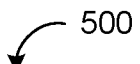

Receiving Target Audio Data Captured By A First Audio Input Device, The Target Audio Data Comprising A Target Audio Signal And A First Version Of An Interfering Audio Signal        502

Receiving Reference Audio Data Captured By A Second Audio Input Device Different From The First Audio Input Device, The Reference Audio Data Comprising A Second Version Of The Interfering Audio Signal        504

Processing, Using A Trained Neural Network, The Target Audio Data And The Reference Audio Data To Generate Enhanced Audio Data, The Neural Network Attenuating The Interfering Audio Signal In The Enhanced Audio Data        506

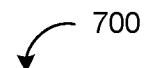

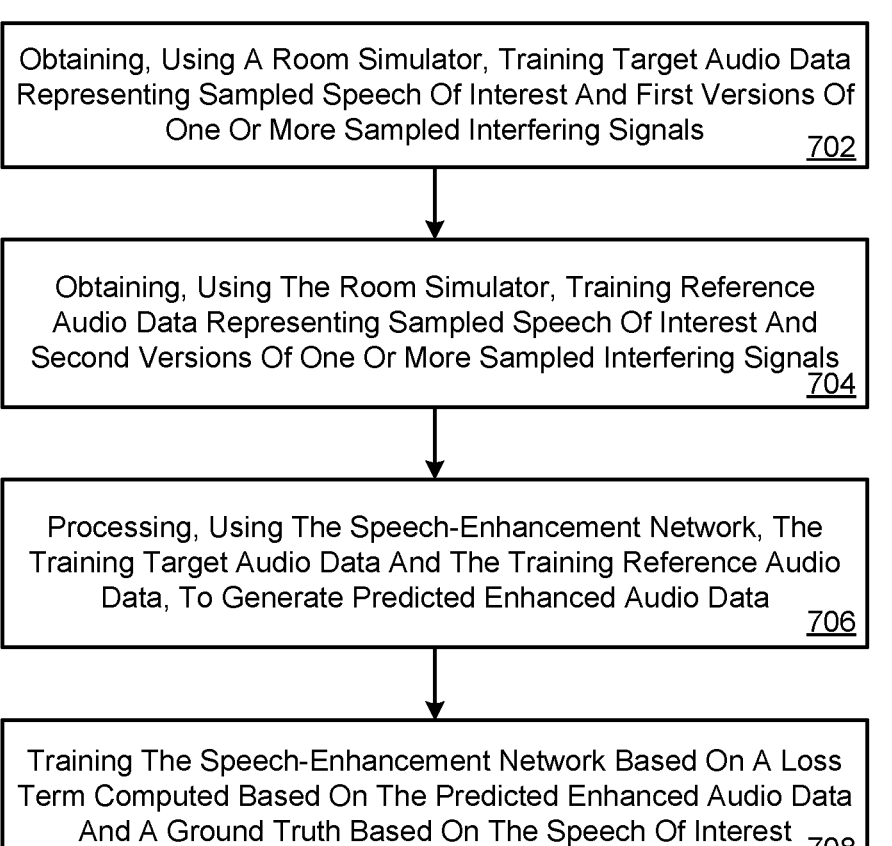

Obtaining, Using A Room Simulator, Training Target Audio Data Representing Sampled Speech Of Interest And First Versions Of One Or More Sampled Interfering Signals 702

Obtaining, Using The Room Simulator, Training Reference Audio Data Representing Sampled Speech Of Interest And Second Versions Of One Or More Sampled Interfering Signals 704

Processing, Using The Speech-Enhancement Network, The Training Target Audio Data And The Training Reference Audio Data, To Generate Predicted Enhanced Audio Data 706

Training The Speech-Enhancement Network Based On A Loss Term Computed Based On The Predicted Enhanced Audio Data And A Ground Truth Based On The Speech Of Interest 708

FIG. 7

SPATIAL REGION BASED AUDIO SEPARATION

TECHNICAL FIELD

This disclosure relates to multi-microphone speech enhancement.

BACKGROUND

Voice is one of the primary methods of communication between individuals. As technology advances, speech as a computer interface is increasingly becoming essential to human-machine interactions.

SUMMARY

One aspect of the present disclosure provides a computer-implemented method executed on data processing hardware that causes the data processing hardware to perform operations including receiving target audio data captured by a first audio input device, the target audio data including a target audio signal and a first version of an interfering audio signal, and receiving reference audio data captured by a second audio input device different from the first audio input device, the reference audio data including a second version of the interfering audio signal. The operations also include processing, using a trained neural network, the target audio data and the reference audio data to generate enhanced audio data, the neural network attenuating the interfering audio signal in the enhanced audio data.

Implementations of the disclosure may include one or more of the following optional features. In some implementations, the target audio signal originates from a first region, the first region defined by a first set of angles, and the neural network is configured to attenuate interfering audio signals originating in a second region different from the first region, the second region defined by a second set of angles different from the first set of angles. In some examples, the first audio input device and the second audio input device are symmetrically arranged relative to the first region.

In some examples, the operations further include, based on processing the target audio data and the reference audio data using the neural network, determining a delay contrast between the first version of the interfering audio signal and the second version of the interfering audio signal, and attenuating the interfering audio signal in the enhanced audio data based on the delay contrast. In some implementations, the delay contrast represents an angular separation between a source of the interfering audio signal and a target signal reception region. In some examples, attenuating the interfering audio signal in the enhanced audio data based on the delay contrast includes attenuating the interfering audio signal when the delay contrast satisfies a threshold; and the operations also include receiving an input representing a time shift, and time shifting the reference audio data by the time shift to effectively adjust a value of the threshold. In some examples, the operations further include, based on processing the target audio data and the reference audio data using the neural network determining a magnitude contrast between a residual interfering audio signal in the enhanced audio data and the second version of the interfering audio signal, and attenuating the residual interfering audio signal in the enhanced audio data based on the magnitude contrast. In some implementations, the target audio signal originates from a first region, the first region defined by a first set of distances, and the neural network is configured to attenuate interfering audio signals originating in a second region different from the first region, the second region defined by a second set of distances different from the first set of distances.

In some examples, the operations further include, based on processing the target audio data and the reference audio data using the neural network, determining a magnitude contrast between the first version of the interfering audio signal and the second version of the interfering audio signal, and attenuating the interfering audio signal in the enhanced audio data based on the magnitude contrast. The magnitude contrast may represent a distance separation between a source of the interfering audio signal and a target signal reception region. In some implementations, attenuating the interfering audio signal in the enhanced audio data based on the magnitude contrast includes attenuating the interfering audio signal when the magnitude contrast satisfies a threshold; and the operations also include receiving an input representing a scalar, and multiplying the reference audio data by the scalar to effectively change the threshold.

In some implementations, a training process trains the neural network by: obtaining training target audio data including sampled speech of interest and a sampled first version of an interfering audio signal; obtaining training reference audio data including a sampled second version of the interfering audio signal; processing, using the neural network, the training target audio data and the training reference audio data to generate predicted enhanced audio data; and training the neural network based on a loss term computed based on the predicted enhanced audio data and the sampled speech of interest.

In some examples, the neural network includes a U-net model architecture. The U-net model architecture may include: a Fourier transform layer; a contracting path including a plurality of two-dimensional (2D) convolution layers trained to successively reduce spatial information while increasing feature information; an expansion path including a plurality of 2D convolution layers trained to combine feature and spatial information through a sequence of up-convolutions and concatenations with high-resolution features from the contracting path; and an inverse Fourier transform layer.

Another aspect of the disclosure provides a system that includes data processing hardware and memory hardware in communication with the data processing hardware. The memory hardware stores instructions that, when executed on the data processing hardware, cause the date processing hardware to perform operations including receiving target audio data captured by a first audio input device, the target audio data including a target audio signal and a first version of an interfering audio signal, and receiving reference audio data captured by a second audio input device different from the first audio input device, the reference audio data including a second version of the interfering audio signal. The operations also include processing, using a trained neural network, the target audio data and the reference audio data to generate enhanced audio data, the neural network attenuating the interfering audio signal in the enhanced audio data.

Implementations of the disclosure may include one or more of the following optional features. In some implementations, the target audio signal originates from a first region, the first region defined by a first set of angles, and the neural network is configured to attenuate interfering audio signals originating in a second region different from the first region, the second region defined by a second set of angles different from the first set of angles. In some examples, the first audio input device and the second audio input device are symmetrically arranged relative to the first region.

In some examples, the operations further include, based on processing the target audio data and the reference audio data using the neural network, determining a delay contrast between the first version of the interfering audio signal and the second version of the interfering audio signal, and attenuating the interfering audio signal in the enhanced audio data based on the delay contrast. In some implementations, the delay contrast represents an angular separation between a source of the interfering audio signal and a target signal reception region. In some examples, attenuating the interfering audio signal in the enhanced audio data based on the delay contrast includes attenuating the interfering audio signal when the delay contrast satisfies a threshold; and the operations also include receiving an input representing a time shift, and time shifting the reference audio data by the time shift to effectively adjust a value of the threshold. In some examples, the operations further include, based on processing the target audio data and the reference audio data using the neural network determining a magnitude contrast between a residual interfering audio signal in the enhanced audio data and the second version of the interfering audio signal, and attenuating the residual interfering audio signal in the enhanced audio data based on the magnitude contrast. In some implementations, the target audio signal originates from a first region, the first region defined by a first set of distances, and the neural network is configured to attenuate interfering audio signals originating in a second region different from the first region, the second region defined by a second set of distances different from the first set of distances.

In some examples, the operations further include, based on processing the target audio data and the reference audio data using the neural network, determining a magnitude contrast between the first version of the interfering audio signal and the second version of the interfering audio signal, and attenuating the interfering audio signal in the enhanced audio data based on the magnitude contrast. The magnitude contrast may represent a distance separation between a source of the interfering audio signal and a target signal reception region. In some implementations, attenuating the interfering audio signal in the enhanced audio data based on the magnitude contrast includes attenuating the interfering audio signal when the magnitude contrast satisfies a threshold; and the operations also include receiving an input representing a scalar, and multiplying the reference audio data by the scalar to effectively change the threshold In some implementations, a training process trains the neural network by: obtaining training target audio data including sampled speech of interest and a sampled first version of an interfering audio signal; obtaining training reference audio data including a sampled second version of the interfering audio signal; processing, using the neural network, the training target audio data and the training reference audio data to generate predicted enhanced audio data; and training the neural network based on a loss term computed based on the predicted enhanced audio data and the sampled speech of interest.

In some examples, the neural network includes a U-net model architecture. The U-net model architecture may include: a Fourier transform layer; a contracting path including a plurality of two-dimensional (2D) convolution layers trained to successively reduce spatial information while increasing feature information; an expansion path including a plurality of 2D convolution layers trained to combine feature and spatial information through a sequence of up-convolutions and concatenations with high-resolution features from the contracting path; and an inverse Fourier transform layer.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is an example flowchart of an example arrangement of operations for improving speech quality using a speech-enhancement network.

FIG. 7 is an example flowchart of an example arrangement of operations for training a speech-enhancement network.

Like reference symbols in the various drawings indicate like elements.

DETAILED DESCRIPTION

Figure 1:
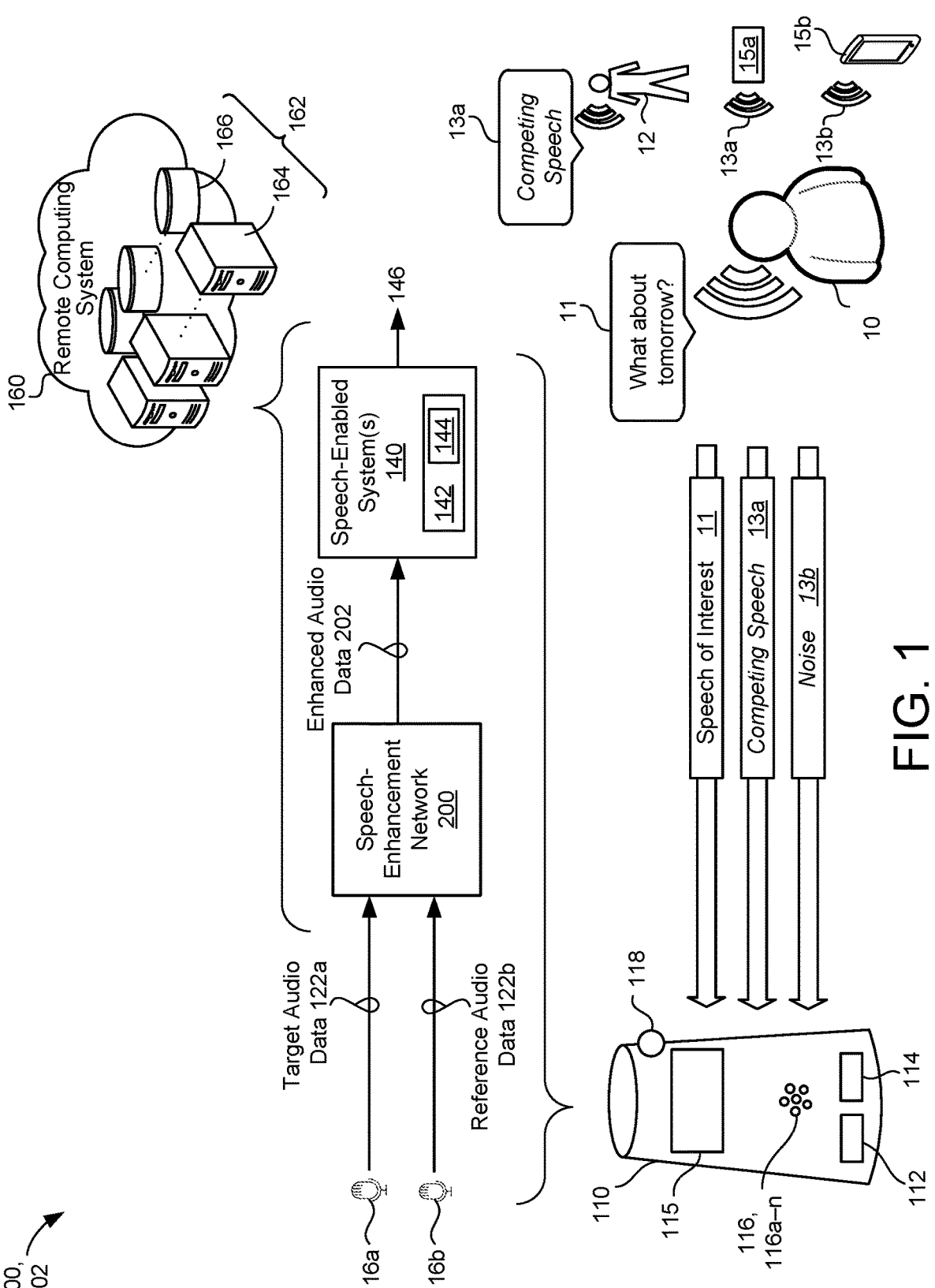
FIG. 1 is a schematic view of an example system that includes a user communicating a spoken target utterance to a user device.

The world is full of various audio sources that may provide cues regarding a surrounding environment. While humans have the ability to separate target audio signals of interest from interfering audio signals, most user devices are not capable of accurately separating audio signals present in captured audio data. Or, if a user device can separate audio signals, the user device relies on blind audio separation, which separates overlapping audio signals in captured audio data without any prior knowledge other than the captured audio data. Blind audio separation is a difficult problem and remains an active research topic. Robustness of automatic speech recognition (ASR) systems has significantly improved over the years with the advent of neural network-based end-to-end models, large-scale training data, and improved strategies for augmenting training data. Nevertheless, background interference can significantly deteriorate the ability of ASR systems to accurately recognize speech directed toward an ASR system. Therefore, there is a need for improving the quality of a captured target audio signal by attenuating interfering audio signals that may inadvertently be included in the captured audio signal. In particular, for reliable communication, a robust audio front-end is needed for enhancing speech and combat various sources of degradation such as, for example, echo, background noise, interfering or competing speech, and room reverberations.

Recognizing that audio sources are often at different physical locations, implementations herein exploit the spatial information present in captured audio data to separate audio sources located in a particular spatial region (e.g., directly in front of a user device) from audio sources located outside the particular spatial region (e.g., to a side of the user device). Here, the particular spatial region represents a portion of an environment of a user device in which the user device expects a source of a target audio signal to be located. In particular, implementations herein utilize two or more audio input devices (e.g., microphones), and a trained speech-enhancement network that processes audio data captured by the two or more audio input devices to exploit spatial information in the captured data to attenuate audio signals originating outside the particular spatial region. Here, spatial information in the captured data may represent a delay contrast (e.g., an inter-microphone phase difference or time difference of arrival information) between when a particular audio signal arrives at a first audio input device and when the particular audio signal arrives at a second audio input device, such that the particular spatial region is an angular or wedged-shaped region. Additionally or alternatively, the spatial information in the captured data may represent a magnitude contrast between the magnitude of a particular audio signal at a first audio input device and the magnitude of the particular audio signal at a second audio input device such that the particular spatial region is a distance-based band. Additionally or alternatively, the spatial information in the captured data may represent both a magnitude contrast and a delay contrast such that the particular spatial region is a band across an angular or wedge-shaped regions. Notably, implementations herein may be deployed on user devices having different microphone geometries and are, thus, device agnostic. Additionally, implementations herein may at run time be dynamically adjusted or steered to use a particular spatial region for performing signal separation rather than requiring multiple trained neural networks for different spatial regions. Here, a particular spatial region may be defined by selecting a range of delays and/or a range of magnitudes that the speech-enhancement network uses for contrasting audio signals. Notably, the speech-enhancement neural network may also be trained to provide additional speech enhancements such as, but not limited to, denoising or reverberation reduction in the same single model.

Referring to FIG. 1, an example system 100 includes a speech-enabled user device 110 (also referred to herein as a user device 110). In the illustrated example, a user 10 communicates a spoken target utterance 11 (also referred to herein as speech of interest 11 or a target audio signal 11) to the speech-enabled user device 110 in a speech environment 102. The user 10 (i.e., speaker of the utterance 11) may speak the target utterance 11 as a query or a command to solicit a response from the user device 110. While capturing the spoken target utterance 11, the user device 110 may also inadvertently capture interfering audio signals from, for example, one or more other users 12 (e.g., competing speech 13a), or non-speech signals 13b emitted by one or more noise sources 15a or one or more other user devices 15b within the speech environment 102. Here, the target utterance 11 spoken by the user 10 may be, for example, an audible query requesting information from a digital assistant application 115 (e.g., chatbot) executing on the user device 110, a command for the digital assistant application 115 to perform an operation, or a speech-based communication captured by the user device 110 (e.g., as part of a text messaging interaction based on transcribed audio, an audio interaction, or an audio-video interaction between the user 10 and another user). One or more speech-enabled systems 140 of the user device 110 or associated with the user device 110 may field the query for the command by answering the query and/or causing the command to be performed.

The system 100 includes a trained speech-enhancement network 200 (e.g., a trained neural network, see FIG. 2) for reducing the effects of interfering audio signals 13 (e.g., the competing speech 13a or the noise 13b) on the target audio signal 11 for generating enhanced audio data 202. In the example shown, the speech-enhancement network 200 is implemented in conjunction with the speech system 140 for transcribing the target utterance 11 that specifies a query or command directed toward the user device 110. In particular, the speech-enhancement network 200 reduces the amount of interfering audio signals 13 that the speech system 140 has to contend with when transcribing the target utterance 11. However, the speech-enhancement network 200 may be used with other systems such as, but not limited to, a speech-based text messaging system, an audio system (e.g., for a telephone call), or an audio-video system (e.g., for a video conference). Implementations herein may be used for other applications such as, but not limited to: (i) a virtual sound wall with a recorder that picks up only audio sources close to its microphones (any sounds such as speech, singing, music, or even noise) and removes everything else farther away than a specific distance for privacy or recording quality; (ii) a what-you-see-is-what-you-hear camcorder that records only the audio sources that the camera sees by controlling zoom level and crop position of the camera to determine a direction of audio separation to apply, and a focal distance to determine a distance of audio separation to apply; (iii) a user configurable camcorder where a user can visualize audio sources in a camera view, and then select which source to keep or remove from the audio recording; (iv) spatial aware post processing to enhance camcorder recordings to retain audio from only a particular region guided by either user input or camera position and then combine the retained audio with spatial rendering to allow high-fidelity binaural recordings in real time; (v) simultaneous voice commands where a smart speaker understands overlapping voice commands from multiple users at the same time, and different users usually are spatially separated so that mixed speech can be separated into individual utterances; or (vi) secure voice command where only voice commands from a particular spatial region (e.g., indoor) are accepted by a smart device such that, for example, thieves cannot unlock the door by shouting voice commands to a smart device in a building.

The user device 110 may correspond to any computing device associated with the user 10 and have a plurality of microphones 116, 116a-n capable of capturing a plurality of streams of input audio data 122, 122a-n. Some examples of user devices 110 include, but are not limited to, mobile devices (e.g., mobile phones, tablets, laptops, etc.), computers, wearable devices (e.g., smart watches, smart headphones, etc.), smart appliances, and internet of things (IoT) devices, smart speakers, vehicle infotainment systems, etc. The user device 110 includes data processing hardware 112, and memory hardware 114 in communication with the data processing hardware 112 and storing instructions that, when executed by the data processing hardware 112, cause the data processing hardware 112 to perform one or more operations. In some implementations, the speech-enhancement network 200 executes on the data processing hardware 112 of the user device 110. In some examples, the speech system 140 also executes on the data processing hardware 112 of the user device 110. However, the speech-enhancement network 200 or the speech system 140 may be executed by a remote system 160.

In some implementations, the user device 110 includes one or more applications (i.e., software applications) 115 where each application 115 may utilize enhanced audio data 202 generated by the speech-enhancement network 200 to perform various functions within the application 115. For instance, the user device 110 may include a digital assistant application (e.g., chat bot) 115 configured to, responsive to the target utterance 11, communicate synthesized playback audio to the user 10 to assist the user 10 with various tasks.

The user device 110 further includes, or is in communication with, an audio subsystem with an array of two or more audio input devices 116 (e.g., microphones) for capturing and converting audio signals present within the speech environment 102 (e.g., the target audio signal 11 and the interfering audio signals 13) into respective streams of input audio data 122. Each microphone 116 of the array of microphones 116 captures audio data 122 representing a corresponding different combination of the target audio signal 11 and the interfering audio signals 13 present within the speech environment 102 based on the physical arrangement of the microphones 116 and the locations of the sources of the audio signals 11, 13 (e.g., the locations of the user 10, the user 12, the noise source 15a, and the devices 15b) within the speech environment 102. For example, a first microphone 116a may be closer to the user 10 than a second microphone 116b, while the second microphone 116b may be closer to a noise source 15a than the first microphone 116a. Thus, relative strengths of the target audio signal 11 and the interfering audio signals 13 in each of stream of audio data 122 will differ. In some examples, outputs of the microphones 116 are sampled at a rate of 16 kHz to generate the streams of input audio data 122.

In some implementations, the user device 110 includes the microphones 116. Additionally or alternatively, the user device 110 may be in communication with one or more microphones 116 separate or remote from the user device 110. For example, the user device 110 may be a mobile device disposed within a vehicle and in wired or wireless communication (e.g., Bluetooth) with two or more microphones 116 of the vehicle. In some configurations, the user device 110 is in communication with least one microphone 116 residing on a separate device, which may include, without limitation, an in-vehicle audio system, a computing device, a speaker, or another user device. In these configurations, the user device 110 may also be in communication with one or more microphones 116 residing on the user device 110. The user device 110 may also include a speech output device 118 (e.g., a speaker) for communicating an audible audio signal (e.g., a synthesized playback audio from the user device 110).

In the example shown, the speech-enabled system(s) 140 include an automatic speech recognition (ASR) system 142 that employs an ASR model 144 to process the enhanced audio data 202 generated by the speech-enhancement network 200 to generate a speech recognition result 146 (e.g., transcription) for the target utterance 11. The ASR system 142 may further include a natural language understanding/processing (NLU/NLP) module (not shown for clarity of illustration) that performs semantic interpretation on the transcription 146 of the target utterance 11 to identify the query/command directed toward the user device 110. As such, the output 146 from the speech system 140 may include the transcription and/or instructions to fulfill the query/command identified by the NLU module.

In additional examples, the speech system(s) 140 is employed by one or more applications 115 executing on the user device 110 such as, without limitation, a digital assistant application, a messaging application, an audio application (e.g., a telephony application), or audio-video application (e.g., a video conferencing application). Here, the messaging, audio, or audio-video application 115 uses the enhanced audio data 202 corresponding to the target utterance 11 to filter the voice of the user 10 for communications to recipients during a messaging, audio, or audio-video communication session. The speech system(s) 140 may additionally or alternatively include a speaker identification model configured to perform speaker identification using the enhanced audio data 202 to identify the user 10 that spoke the target utterance 11.

In some examples, the user device 110 communicates with the remote system 160 via a network (not shown for clarity of illustration). The remote system 160 may include resources 162, such as data processing hardware 164 (e.g., servers or CPUs) and/or memory hardware 166 (e.g., memory, databases, or other storage hardware). The user device 110 may utilize the remote resources 162 to perform various functionality related to speech processing and/or synthesized playback communication. The speech-enhancement network 200 and the speech system(s) 140 may reside on the user device 110 (referred to as on-device systems), or reside remotely (e.g., reside on the remote system 160), but in communication with the user device 110. In some examples, one or more speech systems 140 reside locally or on-device while one or more other speech systems 140 reside remotely. In other words, one or more speech systems 140 leveraging the enhanced audio data 202 output from the speech-enhancement network 200 may be local or remote in any combination. For instance, when a speech system 140 is rather large in size or processing requirements, the system 140 may reside in the remote system 160. Yet, when the user device 110 may support the size or the processing requirements of one or more speech systems 140, the one or more speech systems 140 may reside on the user device 110 using the data processing hardware 112 and/or the memory hardware 114. Optionally, the one or more of the speech systems 140 may reside on both the user device 110 and remotely on the remote system 160. For instance, a speech system 140 may default to execute on the remote system 160 when a connection between the user device 110 and remote system 160 is available, but execute locally on the user device 110 when the connection is lost or unavailable.

In the example shown, the trained speech-enhancement network 200 (e.g., a trained neural network, see FIG. 2) receives target audio data 122a captured by a first audio input device 116a (e.g., a first microphone), and reference audio data 122b captured by a second audio input device 116b (e.g., a second microphone). Here, the target audio data 112a includes a target audio signal 11 (e.g., the spoken utterance 11) and first versions of one or more interfering audio signals 13, and the reference audio data 112b includes second versions of the one or more interfering audio signal 13. The reference audio data 112b may also include a variation of the target audio signal 11. In some implementations, the speech-enhancement network 220 receives and processes additional reference audio data 122c-n captured by additional microphones 116c-n. The speech-enhancement network 200 is configured to process the target audio data 122a and the reference audio data 122b to determine spatial information of the audio data 122 for generating the enhanced audio data 202. Here, the speech-enhancement network 200 attenuates the one or more interfering audio signals 13 in the enhanced audio data 202. In some implementations, the speech-enhancement network 200 processes the target audio data 122a to attenuate the first versions of the one or more interfering audio signals 13 present in the target audio data 122*a* to generate the enhanced audio data 202.

Figure 8:
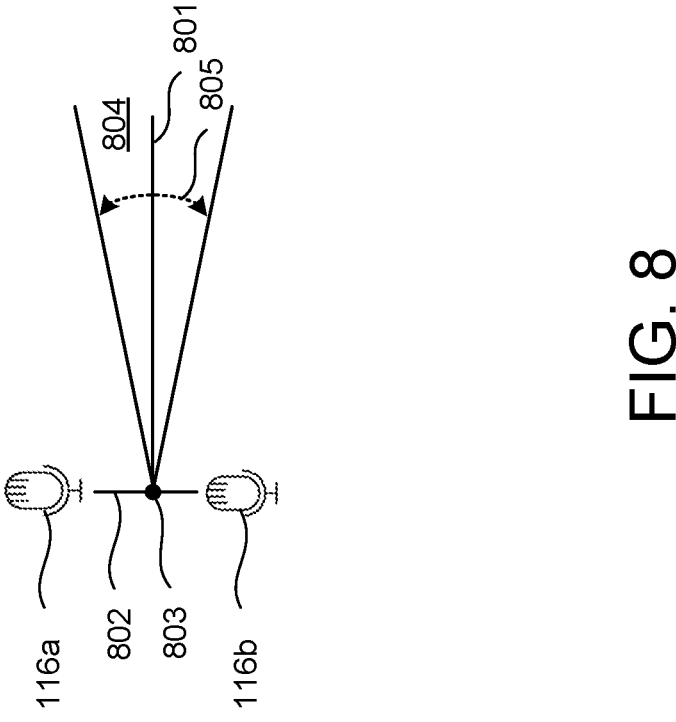
FIG. 8 is a view of an example target signal region.

In some implementations, the speech-enhancement network 200 is configured or steered to receive a target audio signal 11 from a source located in an angular first region defined by a first set of angles relative to the microphones 116, and attenuates interfering audio signals 13 originating in a second region different from the first region (e.g., having a delay contrast that satisfies a threshold) in the enhanced audio data 202. Here, the second region is defined by a second set of angles different from the first set of angles. Notably, because the source of the target audio signal 11 is located in the first region, a delay contrast for the target audio signal 11 will not satisfy the threshold and, thus, may not be attenuated in the enhanced audio data 202. In some implementations, the microphones 116 are symmetrically arranged relative to the angular first region. For example, as shown in FIG. 8, a first line 801 that is perpendicular to a second line 802 between the microphones 116*a* and 116*b* at a midpoint 803 of the second line 802 may symmetrically divide a first region 804 defined by a set of angles 805. However, the angular first region need not be symmetrically aligned with the microphones 116. For example, the angular first region may be rotated relative to the microphones 116. Returning to FIG. 1, in particular, the speech-enhancement network 200 may be configured to determine one or more delay contrasts between the first versions of one or more interfering audio signals 13 and the second versions of the one or more interfering audio signal 13, and attenuate the interfering audio signal 13 in the enhanced audio data 202 based on the delay contrast. Here, the delay contrast represents a difference between a first time at which a particular audio signal (e.g., an interfering audio signal 13) arrives at a first audio input device (i.e., the microphone 116*a*) and a second time at which the particular audio signal arrives at a second audio input device (i.e., the microphone 116*b*) or, alternatively, an angular separation between a source of the interfering audio signal 13 and the first region. For example, an audio source that is angularly further away from the first region as compared to a different audio source will have a larger delay contrast.

In some implementations, the speech-enhancement network 200 is further configured to determine a magnitude contrast between a residual interfering audio signal in the enhanced audio data 202 and the second versions of the interfering audio signals 13, and attenuate the residual interfering audio signal in further enhanced audio data based on the magnitude contrast (e.g., when the magnitude contrast satisfies a threshold). Here, a magnitude contrast represents a difference between the magnitude of a particular audio signal (e.g., an interfering audio signal 13) at a first audio input device (i.e., the microphone 116*a*) and the magnitude of the particular audio signal at a second audio input device (i.e., the microphone 116*b*). For example, an audio source that is half the distance to a particular microphone 116 as compared to a different audio source will have a magnitude that is four times larger at the microphone 116.

Additionally or alternatively, the speech-enhancement network 200 may be configured to determine one or more magnitude contrasts between the first versions of one or more interfering audio signals 13 and the second versions of the one or more interfering audio signal 13, and attenuate the interfering audio signal 13 in the enhanced audio data 202 based on the magnitude contrast. Here, a magnitude contrast represents a difference between the magnitude of a particular audio signal (e.g., an interfering audio signal 13) at a first audio input device (i.e., the microphone 116*a*) and the magnitude of the particular audio signal at a second audio input device (i.e., the microphone 116*b*) or, alternatively, a distance separation between a source of the interfering audio signal 13 and a first region. In some implementations, the speech-enhancement network 200 is configured or steered to receive a target audio signal 11 from a source located in a first region defined by a first set of distances from the microphones 116, and attenuates interfering audio signals 13 originating in a second region different from the first region (e.g., having a magnitude contrast that satisfies a threshold). Here, the second region is defined by a second set of distances different from the first set of distances. Notably, because the source of the target audio signal 11 is located in the first region, its magnitude contrast will not satisfy the threshold and, thus, may not be attenuated in the enhanced audio data 202.

The speech-enhancement network 200 may be steered or configured during runtime to use or implement a particular first region. For example, the speech-enhancement network 200 may multiply the reference audio data 122*b* by a scalar to effectively change the threshold for comparing with a magnitude contrast. Additionally or alternatively, the speech-enhancement network 200 may artificially delay or advance the reference audio data 122*b* (e.g., by shifting data in memory) to effectively change the threshold for comparing with a delay contrast.

In some examples, the speech-enhancement network 200 is configured to attenuate interfering audio signals 13 based on both delay contrast and magnitude contrast. Alternatively, a first speech-enhancement network 200 may be configured to attenuate interfering audio signals 13 based on delay contrast while a second speech-enhancement network 200 is configured to attenuate interfering audio signals 13 based on magnitude contrast. In some implementations, multiple speech-enhancement networks 200 are stacked to attenuate interfering audio signals 13 based on a complex first region (e.g., a stack of a plurality of first regions implemented by a plurality of speech-enhancement networks 200), or to take advantage of additional reference audio data 122 captured by additional microphones 116. For example, if a user device 110 has three microphones 116*a-c*, a first speech-enhancement network 200 may process the audio data 122*a* as target audio data and the audio data 122*b* as reference audio data. A second speech-enhancement network 200 may then process the output of the first speech-enhancement network 200 as target audio data and audio data 122*c* captured by the microphone 116*c* as reference audio data.

Notably, by configuring the speech-enhancement network 200 with a particular set of angles and/or a particular set of distances, the speech-enhancement network 200 may be trained independent of any particular microphone arrangement and is, thus, highly transferable to a plurality of different user devices. That is, the speech-enhancement network 200 may be trained to be generic to, applicable to, or may be executed on a wide range of user devices, even though the microphone array of a particular user device is specific to that user device. In other words, the same speech-enhancement network 200 may be used on different user devices even though the physical arrangement of microphones 116 may vary from user device to user device.

Notably, the speech-enhancement network 200 may be a causal streamable inference neural network that is capable of real-time streaming speech enhancement on streams of audio data 122. That is, the speech-enhancement network 200 may be used in scenarios requiring speech enhancement with very low latency (i.e., in near real time). The speech-enhancement network 200 may also be trained to provide additional speech enhancements such as, but not limited to, echo cancelation, denoising, or reverberation reduction in a single model.

Figure 2:
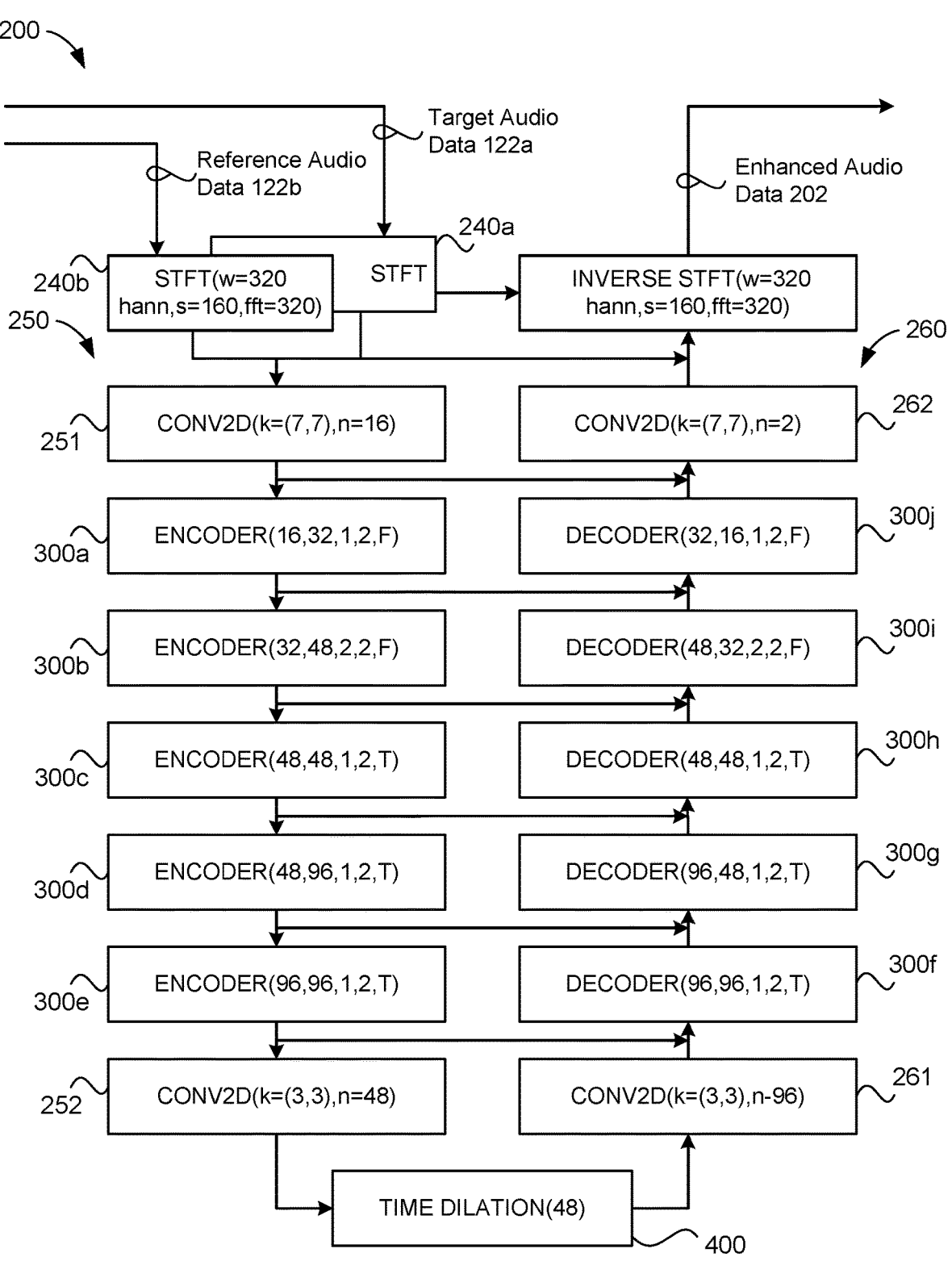
FIG. 2 is a schematic view of an example speech-enhancement network.

FIG. 2 is a schematic view of an example of the trained speech-enhancement network 200 of FIG. 1. The example speech-enhancement network 200 may include a trained U-net model neural network architecture having symmetric encoders and decoders, and skip connections between each encoder and its mirrored decoder. However, the speech-enhancement network 200 may include, or be based on, other model architectures. FIG. 2 shows the details of a specific example configuration of the U-net model architecture. In the example shown, the two-dimensional (2D) convolution operations are performed causally to enable real-time streaming inference, and the 2D convolution operations include ring buffers to hold relevant input history so that inferences may be performed incrementally in time without losing history context.

The speech-enhancement network 200 performs operations in the frequency or spectral (rather than time) domain and, thus, the speech-enhancement network 200 includes short-time Fourier transform (STFT) layers 240a and 240b that compute corresponding Fourier transforms of corresponding ones of the target audio data 122a and the reference audio data 122b, and outputs of the STFT layers 240a and 240b are concatenated.

The speech-enhancement network 200 includes a contracting path 250 that successively reduces spatial information while increasing feature information through repeated 2D convolutions. The contracting path 240 includes a first 2D convolution layer 251, a plurality of encoder layers 300, 300a-e, and a second 2D convolution layer 252. Each layer 251, 252, 300a-e of the contracting path 250 is followed by a leaky rectified linear unit (ReLU) with a slope coefficient of 0.3, and a max pooling operation. FIG. 2 depicts the configuration parameters for each of the layers 251, 252, 300a-e.

The speech-enhancement network 200 includes an expansion path 260 that combines feature and spatial information through a sequence of up-convolutions and concatenations with high-resolution features from the contracting path 250. The expansion path 260 includes a third 2D convolution layer 261, a plurality of decoder layers 300, 300f-j, and a final 2D convolution layer 262. FIG. 2 depicts the configuration parameters for each of the layers 261, 262, 300f-j.

The speech-enhancement network 200 includes a time dilation layer 400 between the contracting path 250 and the expansion path 260, and an inverse STFT layer 270 to convert an output of the final 2D convolution layer 262 in the spectral domain back to the time domain to generate the enhanced audio data 202.

In the example shown, the speech-enhancement network 200 performs an inference once every two STFT frames. With a sample rate of 16 kHz for the target audio data 122a and the reference audio data 122b, and an STFT window of 20 ms (i.e., 320 samples) and a step size of 10 ms, the speech-enhancement network 200 has a latency of 30 ms. By way of comparison, a typical end-to-end voice over IP (VOIP) connection has a significantly greater latency of about 200 ms.

Figure 3:
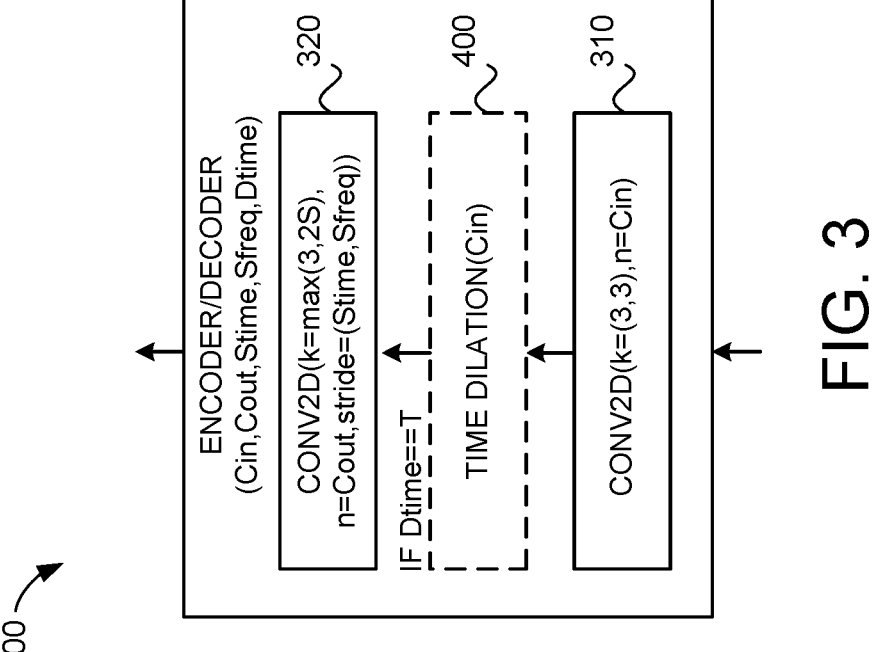
FIG. 3 is a schematic view of an example encoder or decoder block.

FIG. 3 is a schematic view of an example encoder layer 300. The decoder layers 300f-j of FIG. 2 are arranged symmetrically to the encoder layers 300a-e of FIG. 2. That is, the order of the layers 310, 320, and 400 shown in FIG. 3 is reversed for a decoder layer 300. The configuration parameters in FIG. 3 for a particular encoder/decoder 300 are as specified in FIG. 2. For example, the encoder 300a has a set of parameters (Cin, Cout, Stime, Sfreq, Dtime)=(16, 32, 1, 2, F), wherein Dtime is a logical input equal to T for true, or F for false. The encoder/decoder layer 300 has two 2D convolutions layers 310 and 320, and an optional time dilation layer 400. The time dilation layer 400 is only performed when Dtime is equal to T. When the time dilation layer 400 is not performed, the 2D convolution layer 320 convolves the output of the 2D convolution layer 310. Otherwise, the time dilation layer 400 processes the output of the 2D convolution layer 310, and the 2D convolution layer 320 processes the output of the time dilation layer 400.

For an encoder 300, the 2D convolution layer 310 computes 2D convolution with a 3×3 kernel. With the example configuration parameters shown in FIG. 2, the 2D convolution layer 320 computes a 2D convolution with a stride of 1×2 if downsampling in the frequency dimension, or a stride of 2×2 if downsampling in both the time and frequency dimensions. The 2D convolution of the 2D convolution layer 320 is performed with a kernel size that is selected to be a multiple of the stride to ensure even contributions from all locations of an input feature map. For a decoder 300, the 2D convolution layer 320 first computes a transposed 2D convolution for up-sampling followed by the 3×3 2D convolution layer 310.

Figure 4:
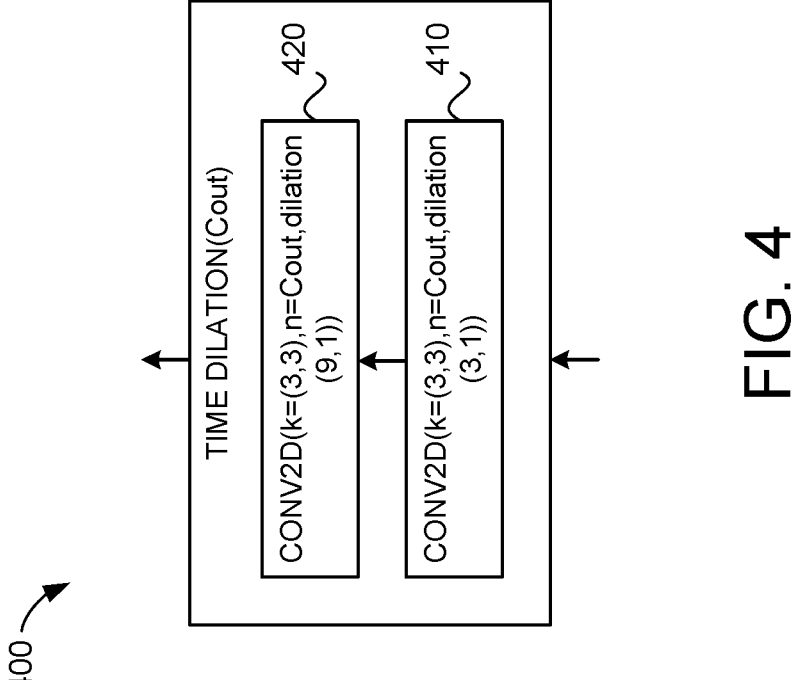
FIG. 4 is a schematic view of an example time dilation block.

FIG. 4 is a schematic view of an example time dilation layer 400. The configuration parameters in FIG. 4 may correspond to a particular time dilation layer 400 as specified in FIG. 2 or FIG. 3. For example, the time dilation layer 400 in FIG. 2 has a parameter Cout=48. The time dilation layer 400 includes two 2D convolution operations 410 and 420.

FIG. 5 includes a flowchart of an example arrangement of operations for a method 500 of enhancing an audio signal using the speech-enhancement network 200. The method may execute on the data processing hardware 112 of the user device 110. At operation 502, the method 500 includes receiving target audio data 122a captured by a first audio input device 116a, the target audio data 112a including a target audio signal 11 and a first version of an interfering audio signal 13. At operation 504, the method 500 includes receiving reference audio data 122b captured by a second audio input device 116b different from the first audio input device 116a, the reference audio data 122b including a second version of the interfering audio signal 13.

At operation 506, the method 500 includes processing, using the trained speech-enhancement network 200, the target audio data 122a and the reference audio data 122b to generate enhanced audio data 202, the speech-enhancement network 200 attenuating the interfering audio signal 13 in the enhanced audio data 202.

Figure 6:
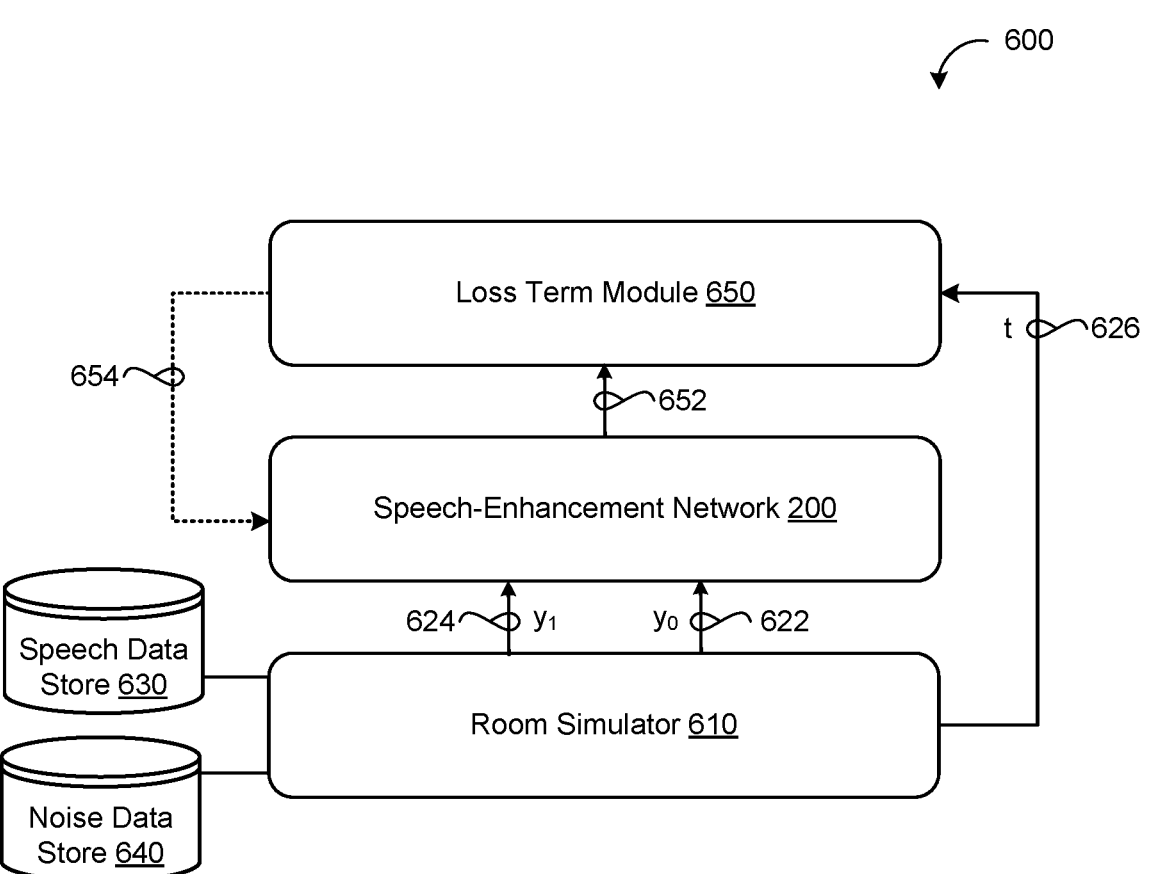
FIG. 6 is a schematic view of an example training process for training a speech-enhancement network.

FIG. 6 is a schematic view of an example training process 600 for training the speech-enhancement network 200 to enhance speech based on delay contrast and/or magnitude contrast. The remote computing system 160 may execute the training process 600 for training the speech-enhancement network 200. The trained speech-enhancement network 200 may be loaded onto user devices 110 for enhancing speech. To train the speech-enhancement network 200 to be agnostic to a microphone array configuration, the example training process 600 simulates the effect of a generic microphone array arrangement using simulated training data and by controlling gains for different signal components.

Figure 9:
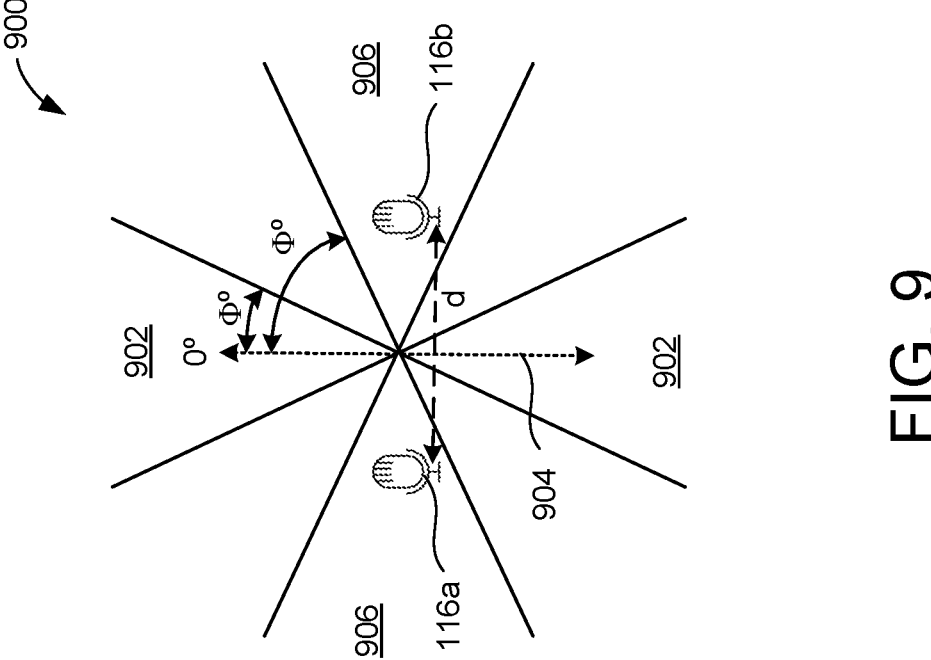
FIG. 9 is a view of example target and inferring signal regions for a room simulator.

The training process 600 includes a room simulator 610 for sampling or modeling room impulse responses $\{r_{(k,j)}\}$ between multiple audio sources and multiple microphones 116. In some examples, the room simulator 610 samples or models, for each training sample, a randomly sampled room layout, randomly sampled microphone separation, and randomly sampled audio source locations. As shown in FIG. 9, based on the locations of the microphones 116, the room simulator 610 divides a 3D room space 900 into disjoint regions including a target signal region 902 that may contain target audio sources whose positions may generally extend in front of and behind the microphones 116 with an angular width of between 0° and ° degrees relative to a plane 904 that is perpendicular to a plane of microphones 116. The plane 904 goes through a midpoint between the microphones 116. An interfering signal region 906 of the 3D room space 900 extends from either side of the microphones 116 and may contain inferring audio sources whose positions are at least @° degrees relative to the plane 904.

Returning to FIG. 6, for each training sample, the room simulator 610 creates four signal sources: two target speech audio sources randomly positioned in the target signal region 902; an interfering speech audio source randomly positioned in the interfering signal region 906; and a noise audio source randomly positioned in the 3D room space 900. Given a room geometry, 2 microphone locations, and 4 signal source locations, the room simulator 610 creates a 4×2 room impulse response (RIR) matrix $\{r_{(k,j)}\}_{0 \leq k \leq 3, 0 \leq j \leq 1}$ using, for example, the image method for efficiently simulating small-room acoustics of Jont B. Allen et al. Training target audio data $y_0$ 622 for the microphone 116a may be simulated as:

$$y_0 = s_1 * r_{(0,0)} + s_2 * r_{(1,0)} + i * r_{(2,0)} + g_n n * r_{(3,0)} \qquad \text{EQN (1)}$$

where $s_1$, $s_2$, and i are utterances from a speech data store 630, and noise n is from a noise data store 640. Training reference audio data $y_1$ 624 for the microphone 116b may be similarly simulated as:

$$y_1 = s_1 * r_{(0,1)} + s_2 * r_{(1,1)} + i * r_{(2,1)} + g_n n * r_{(3,1)} \qquad \text{EQN (2)}$$

With probability $p_1$, the room simulator 610 sets the utterance $s_2$ to empty and, with probability $p_2$, the room simulator 610 sets the utterance i to empty. Here, the probabilities $p_1$ and $p_2$ ensure that the speech-enhancement model 200 may handle both single and multiple target utterances as a separation target, with and without the presence of interference. To add variations to the signal strengths of different components, $s_1$, $s_2$, i and n, the average power of these components may controlled by normalizing and scaling the signal to follow a randomly sampled magnitude value, denoted as $\{g_k\}_{0 \leq k \leq 3}$. The room simulator 610 then applies global power normalizing and scaling to obtain a final output power of g global. A ground-truth signal t 626 for training the speech-enhancement network 200 is the non-reverberated version of the input without the noise and interference sources, which may be expressed as:

$$t = s_1 * \text{anechoic}(r_{(0,0)}) + s_2 * \text{anechoic}(r_{(1,0)}) \qquad \text{EQN (3)}$$

An example set of parameters for the room simulator 610 includes:

| Type | Configuration |
| --- | --- |
| Geometry | $\theta = 30°$, $\phi = 60°$, d~Uniform[0.09 m, 0.11 m] |
| Signal synthesis | $p_1 = 0.8$, $p_2 = 0.6$<br>$g_0 \sim \mathcal{N}(0, 0)$, $g_1 \sim \mathcal{N}(-3, 3)$, $g_2 \sim \mathcal{N}(-3, 3)$,<br>$g_3 \sim \mathcal{N}(-5, 10)$, $g_{global} \sim \mathcal{N}(-10, 5)$ |

For each paired training sample (t 626: $y_1$ 624, $y_0$ 622) generated by the room simulator 610, the training process 600 processes, using the speech-enhancement network 200, the simulated target audio data $y_0$ 622 and the simulated reference audio data $y_1$ 624 to obtain predicted enhanced audio data 652.

Thereafter, for each paired training sample (t 626: $y_1$ 624, $y_0$ 622), a loss term module 650 receives the predicted enhanced audio data 652, and computes a loss term 654 between the predicted enhanced audio data 652 and the ground truth t 626. Based on the loss term 654 output by the loss term module 650 for each training sample, the training process 600 trains the speech-enhancement network 200 to minimize the loss term 654.

FIG. 7 includes a flowchart of an example arrangement of operations for a method 700 of training the speech-enhancement network 200, i.e., via the training process 600 of FIG. 6. At operation 702, the method 700 includes generating, using a room simulator (e.g., using EQN (1)), training target audio data $y_0$ 622 including sampled speech of interest s and one or more sampled interfering signals (e.g., the noise n and/or the competing speech i). The method 700 includes, at operation 704, generating, using the room simulator 610 (e.g., using EQN (2)), training reference audio data $y_1$ 624.

At operation 706, the method 700 includes processing, using the speech-enhancement network 200, the training target audio data $y_0$ 622 and the training reference audio data $y_1$ 624 to generate predicted enhanced audio data 652. At operation 708, the method 700 includes training the speech-enhancement network 200 based on a loss term 654 computed based on the predicted enhanced audio data 652 and a ground truth t 626 that is based on the speech of interest s.

Figure 10:
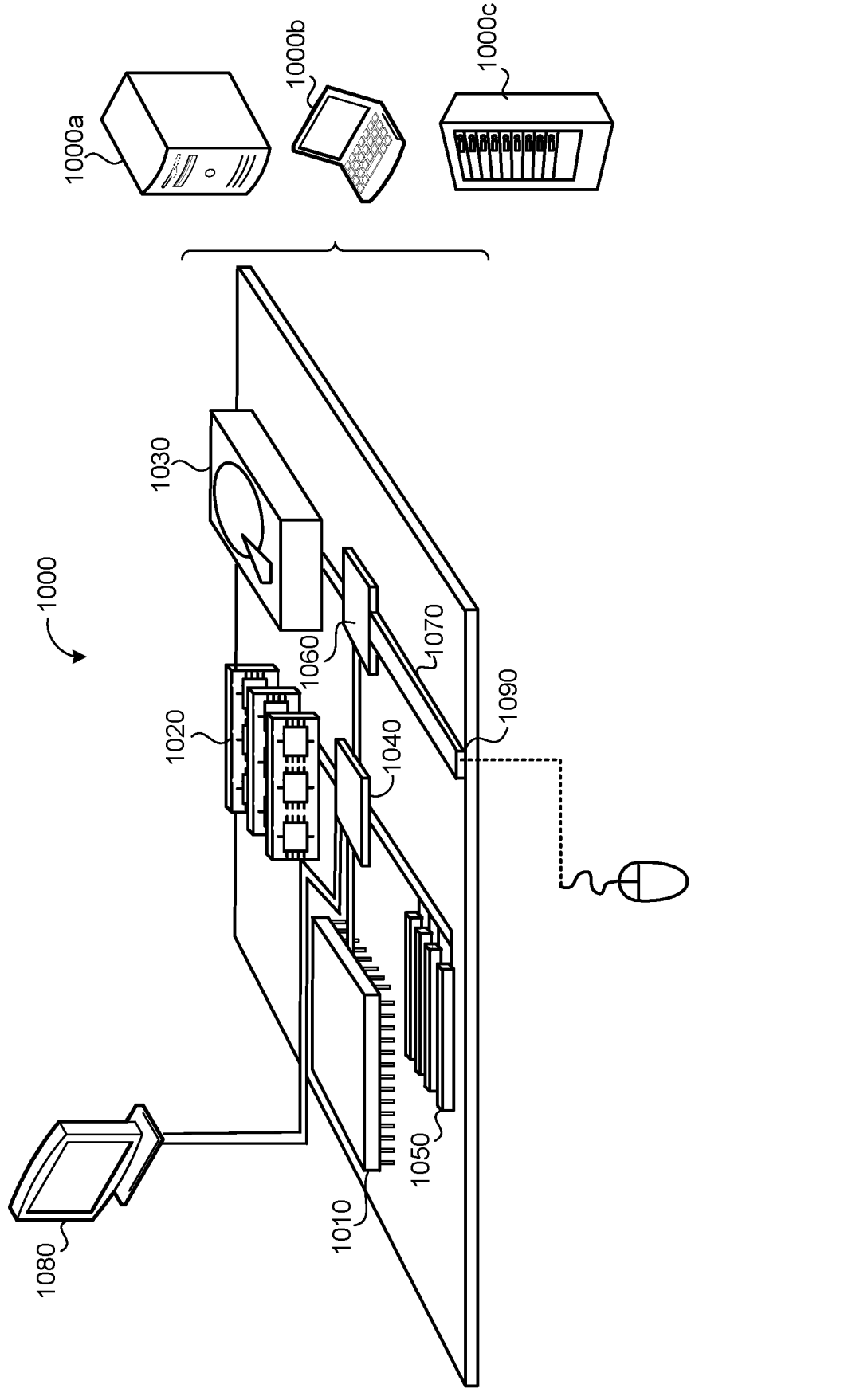
FIG. 10 is a schematic view of an example computing device that may be used to implement the systems and methods described herein.

FIG. 10 is schematic view of an example computing device 1000 that may be used to implement the systems and methods described in this document. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosures described and/or claimed in this document.

The computing device 1000 includes a processor 1010 (i.e., data processing hardware) that can be used to implement the data processing hardware 112 and 164), memory 1020 (i.e., memory hardware) that can be used to implement the memory hardware 114 and 166), a storage device 1030 (i.e., memory hardware) that can be used to implement the memory hardware 114 and 166 and the data stores 630 and 640, a high-speed interface/controller 1040 connecting to the memory 1020 and high-speed expansion ports 1050, and a low speed interface/controller 1060 connecting to a low speed bus 1070 and a storage device 1030. Each of the components 1010, 1020, 1030, 1040, 1050, and 1060, are interconnected using various busses, and may be mounted on a common motherboard or in other manners as appropriate. The processor 1010 (e.g., data processing hardware 112, 134 of FIG. 1) can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 (e.g., memory hardware 114, 136 of FIG. 1) stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and a low-speed expansion port 1090. The low-speed expansion port 1090, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1000a or multiple times in a group of such servers 1000a, as a laptop computer 1000b, or as part of a rack server system 1000c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

receiving target audio data captured by a first audio input device, the target audio data comprising a target audio signal and a first version of an interfering audio signal;

receiving reference audio data captured by a second audio input device different from the first audio input device, the reference audio data comprising a second version of the interfering audio signal;

processing, using a trained neural network, the target audio data and the reference audio data to generate enhanced audio data;

determining at least one of a delay contrast or a magnitude contrast between the first version of the interfering audio signal and the second version of the interfering audio signal; and attenuating, using the trained neural network, at least one of the first version of the interfering audio signal or the second version of the interfering audio signal in the enhanced audio signal based on the at least one of the delay contrast or the magnitude contrast.

2. The computer-implemented method of claim 1, wherein:

the target audio signal originates from a first region, the first region defined by a first set of angles; and the neural network is configured to attenuate interfering audio signals originating in a second region different from the first region, the second region defined by a second set of angles different from the first set of angles.

3. The computer-implemented method of claim 2, wherein the first audio input device and the second audio input device are symmetrically arranged relative to the first region.

4. The computer-implemented method of claim 1, wherein the delay contrast represents an angular separation between a source of the at least one of the first version of the interfering audio signal or the second version of the interfering audio signal and a target signal reception region.

5. The computer-implemented method of claim 1, wherein:

attenuating the at least one of the first version of the interfering audio signal or the second version of the interfering audio signal in the enhanced audio data based on the at least one of the delay contrast or the magnitude contrast comprises attenuating the at least one of the first version of the interfering audio signal or the second version of the interfering audio signal when the delay contrast satisfies a threshold; and the operations further comprise:

receiving an input representing a time shift; and time shifting the reference audio data by the time shift to effectively adjust a value of the threshold.

6. The computer-implemented method of claim 1, wherein:

the target audio signal originates from a first region, the first region defined by a first set of distances; and the neural network is configured to attenuate interfering audio signals originating in a second region different from the first region, the second region defined by a second set of distances different from the first set of distances.

7. The computer-implemented method of claim 1, wherein the magnitude contrast represents a distance separation between a source of the at least one of the first version of the interfering audio signal or the second version of the interfering audio signal and a target signal reception region.

8. The computer-implemented method of claim 1, wherein:

attenuating the at least one of the first version of the interfering audio signal or the second version of the interfering audio signal in the enhanced audio data based on the at least one of the delay contrast or the magnitude contrast comprises attenuating the at least one of the first version of the interfering audio signal or the second version of the interfering audio signal when the magnitude contrast satisfies a threshold; and the operations further comprise:

receiving an input representing a scalar; and multiplying the reference audio data by the scalar to effectively change the threshold.

9. The computer-implemented method of claim 1, wherein a training process trains the neural network by:

obtaining training target audio data comprising sampled speech of interest and a sampled first version of an interfering audio signal;

obtaining training reference audio data comprising a sampled second version of the interfering audio signal;

processing, using the neural network, the training target audio data and the training reference audio data to generate predicted enhanced audio data; and training the neural network based on a loss term computed based on the predicted enhanced audio data and the sampled speech of interest.

10. The computer-implemented method of claim 1, wherein the neural network comprises a U-net model architecture.

11. The computer-implemented method of claim 10, wherein the U-net model architecture comprises:

a Fourier transform layer;

a contracting path comprising a plurality of two-dimensional (2D) convolution layers trained to successively reduce spatial information while increasing feature information;

an expansion path comprising a plurality of 2D convolution layers trained to combine feature and spatial information through a sequence of up-convolutions and concatenations with high-resolution features from the contracting path; and and an inverse Fourier transform layer.

12. A system comprising:

data processing hardware; and memory hardware in communication with the data processing hardware, the memory hardware storing instructions that, when executed on the data processing hardware, cause the data processing hardware to perform operations comprising:

receiving target audio data captured by a first audio input device, the target audio data comprising a target audio signal and a first version of an interfering audio signal;

receiving reference audio data captured by a second audio input device different from the first audio input device, the reference audio data comprising a second version of the interfering audio signal;

processing, using a trained neural network, the target audio data and the reference audio data to generate enhanced audio data;

determining at least one of a delay contrast or a magnitude contrast between the first version of the interfering audio signal and the second version of the interfering audio signal; and attenuating, using the trained neural network, at least one of the first version of the interfering audio signal or the second version of the interfering audio signal in the enhanced audio signal based on the at least one of the delay contrast or the magnitude contrast.

13. The system of claim 12, wherein:

the target audio signal originates from a first region, the first region defined by a first set of angles; and the neural network is configured to attenuate interfering audio signals originating in a second region different from the first region, the second region defined by a second set of angles different from the first set of angles.

14. The system of claim 13, wherein the first audio input device and the second audio input device are symmetrically arranged relative to the first region.

15. The system of claim 12, wherein the delay contrast represents an angular separation between a source of the at least one of the first version of the interfering audio signal or the second version of the interfering audio signal and a target signal reception region.

16. The system of claim 12, wherein:

attenuating the at least one of the first version of the interfering audio signal or the second version of the interfering audio signal in the enhanced audio data based on the at least one of the delay contrast or the magnitude contrast comprises attenuating the at least one of the first version of the interfering audio signal or the second version of the interfering audio signal when the delay contrast satisfies a threshold; and the operations further comprise:

receiving an input representing a time shift; and time shifting the reference audio data by the time shift to effectively adjust a value of the threshold.

17. The system of claim 12, wherein:

the target audio signal originates from a first region, the first region defined by a first set of distances; and the neural network is configured to attenuate interfering audio signals originating in a second region different from the first region, the second region defined by a second set of distances different from the first set of distances.

18. The system of claim 12, wherein the magnitude contrast represents a distance separation between a source of the at least one of the first version of the interfering audio signal or the second version of the interfering audio signal and a target signal reception region.

19. The system of claim 12, wherein:

attenuating the at least one of the first version of the interfering audio signal or the second version of the interfering audio signal in the enhanced audio data based on the at least one of the delay contrast or the magnitude contrast comprises attenuating the at least one of the first version of the interfering audio signal or the second version of the interfering audio signal when the magnitude contrast satisfies a threshold; and the operations further comprise:

receiving an input representing a scalar; and multiplying the reference audio data by the scalar to effectively change the threshold.

20. The system of claim 12, wherein a training process trains the neural network by:

obtaining training target audio data comprising sampled speech of interest and a sampled first version of an interfering audio signal;

obtaining training reference audio data comprising a sampled second version of the interfering audio signal;

processing, using the neural network, the training target audio data and the training reference audio data to generate predicted enhanced audio data; and training the neural network based on a loss term computed based on the predicted enhanced audio data and the sampled speech of interest.

21. The system of claim 12, wherein the neural network comprises a U-net model architecture.

22. The system of claim 21, wherein the U-net model architecture comprises:

a Fourier transform layer;

a contracting path comprising a plurality of two-dimensional (2D) convolution layers trained to successively reduce spatial information while increasing feature information;

an expansion path comprising a plurality of 2D convolution layers trained to combine feature and spatial information through a sequence of up-convolutions and concatenations with high-resolution features from the contracting path; and and an inverse Fourier transform layer.

* * * * *